United States Patent [19]
Luo et al.

[11] Patent Number: 5,893,985
[45] Date of Patent: Apr. 13, 1999

[54] PLASMA ARC TORCH

[75] Inventors: Lifeng Luo, Solon; William T. Matthews, Mentor; David W. Perrin, Wadsworth, all of Ohio

[73] Assignee: The Lincoln Electric Company, Cleveland, Ohio

[21] Appl. No.: 08/818,744

[22] Filed: Mar. 14, 1997

[51] Int. Cl.⁶ .................................................. B23K 10/00
[52] U.S. Cl. ........................... 219/121.48; 219/121.5; 219/121.51; 219/75; 219/121.52
[58] Field of Search ...................... 219/121.5, 121.48, 219/121.39, 121.44, 121.51, 121.52, 74, 75; 313/231.31, 231.41; 315/111.21

[56] References Cited

U.S. PATENT DOCUMENTS

| | | |
|---|---|---|
| 3,366,772 | 1/1968 | Wickham . |
| 3,450,926 | 6/1969 | Kiernan . |
| 4,682,055 | 7/1987 | Marhic ................................ 219/75 |
| 4,902,871 | 2/1990 | Sanders . |
| 4,973,816 | 11/1990 | Haberman ..................... 219/121.48 |
| 5,013,885 | 5/1991 | Carkhuff . |
| 5,164,568 | 11/1992 | Sanders ........................... 219/121.5 |
| 5,235,155 | 8/1993 | Yamada . |
| 5,296,668 | 3/1994 | Foreman . |
| 5,451,739 | 9/1995 | Nemchinsky . |
| 5,514,848 | 5/1996 | Ross . |
| 5,591,356 | 1/1997 | Sakuragi . |
| 5,681,489 | 10/1997 | Carkhuff ......................... 219/121.51 |

FOREIGN PATENT DOCUMENTS 0215469  8/1989  Japan .......................... 219/121.5

*Primary Examiner*—Mark Paschall
*Attorney, Agent, or Firm*—Vickers, Daniels & Young

[57] ABSTRACT

A plasma torch comprises a tubular nozzle having an end wall and an electrode in the nozzle having a nose end facing the end wall. The nose end and end wall provide a plasma gas chamber, and the end wall has a gas chamber outlet opening extending axially therethrough. The gas chamber has an entrance radially outwardly of the outlet opening and the end wall has a plurality of arcuate ribs thereon circumferentially spaced apart about said outlet opening and providing a plurality of arcuate gas directing channels for radially guiding the flow of plasma gas in a swirling flow pattern from the entrance to the outlet opening. The nozzle and nozzle mounting components provide an improved arrangement for cooling the torch tip and producing a gas shield about the plasma jet.

73 Claims, 4 Drawing Sheets

PLASMA ARC TORCH

BACKGROUND OF THE INVENTION

The present invention relates to the art of plasma arc torches and, more particularly, to improvements in connection with the flow of gas therethrough for cooling and operating the torch.

It is of course well known that a plasma arc torch comprises an electrode and a nozzle in which a nose end of the electrode is supported for the end of the nose of the electrode to face an end wall of the nozzle which has a plasma outlet opening therethrough. The electrode and nozzle may be relatively displaceable between a position in which the electrode contacts the end wall of the nozzle and a position in which the electrode is spaced an operating distance from the end wall, whereby a pilot arc can be created as the electrode moves away from the end wall to its operating position. Alternatively, the electrode and nozzle can be fixed relative to one another, whereby the torch is started by the use of high frequency or other known starting procedures. In any event, the end wall of the nozzle and the end face of the electrode provide a gas chamber into which a plasma or arc gas is supplied and from which a plasma jet is emitted through the outlet opening when an arc current is flowed between the electrode and nozzle. Upon starting the torch, the latter operates in a non-transferred pilot arc mode and, by moving the nozzle into proximity with the work piece, the arc is transferred thereto and the torch then operates in the arc-transferred mode. Such torches are of course well known for use in connection with heating, welding, cutting, melting, annealing, and the like.

It is also known in connection with plasma arc torches of the foregoing character to impart a swirling motion to the plasma gas upstream of the gas chamber for cooling purposes and in an effort to keep the emitted plasma jet focused on line with the axis of the electrode. Such swirling is helpful in producing a good quality plasma arc, improving cutting speed and in promoting economy and efficiency with respect to the work performed and operation of a torch. It is also known to direct swirling gas inwardly across the end surface of the electrode in a fixed electrode to nozzle arrangement for removing products of erosion from the nozzle to increase the life thereof. Other efforts with respect to controlling gas flow have included the swirling of gas about the plasma jet as it exits the outlet opening through the nozzle for stabilizing the plasma jet against lateral wandering, and reducing the amount of swirling and the velocity of the plasma gas entering the gas chamber and prior to the exiting of the plasma jet therefrom so as to achieve a smooth flow of the plasma gas and to maintain stability of the arc jet in the torch. Swirling of the gas prior to entrance thereof into the gas chamber between the electrode and the plasma jet outlet has included the radially inwardly directing of swirling gas about the nose end of the electrode for stabilizing the plasma jet against lateral wandering.

While efforts such as those mentioned above have been operable at least to some extent to control the direction of the plasma jet and to provide a shield thereabout, it remains that the swirling of the gas degenerates between the point of its creation and the plasma jet outlet whereby the desired constricting of the jet to follow a straight line between the nozzle and a workpiece is not fully achieved. Furthermore, the arrangements heretofore provided in an effort to obtain the desired control of the plasma jet as well as the flow of a shield gas thereabout have been structurally complex and thus undesirably expensive to manufacture and maintain. With regard to degeneration of the swirling motion, once the gas exits the passageway or passageways by which the swirling motion is imparted thereto the gas travels to and through the gas chamber to the plasma jet outlet opening along interior surfaces of the nozzle which are smooth and therefore ineffective for maintaining the initial swirling movement. Moreover, the swirling gas most often experiences a pressure drop as it exits the passage or passageways by which it is created and such a pressure drop also contributes to degeneration of the swirling flow pattern.

SUMMARY OF THE INVENTION

In accordance with the present invention, an improved nozzle and electrode arrangement is provided for a plasma arc torch by which the foregoing and other disadvantages attendant to the control of gas flow therethrough are minimized or overcome. In particular, in this respect, the end wall of the nozzle component which includes the outlet opening through which the plasma jet exits the nozzle is provided with a structure which provides for the plasma gas entering the periphery of the gas chamber to be radially guided across the end wall to the outlet opening in a swirling pattern, whereby the gas is swirled right to the entrance end of the plasma jet outlet to radially squeeze or constrict the gas into a jet having improved linearity and stability against lateral deflection. At the same time, the swirling gas flow is downstream from the nose end of the electrode and, therefore, does not have an erosive effect thereon and does not reduce the electrode life. Preferably, the swirling motion is imparted to the gas by providing the inner side of the end wall of the nozzle with a plurality of circumferentially spaced apart arcuate ribs which provide arcuate channels therebetween extending radially and circumferentially toward the outlet opening from the outer periphery of the gas chamber, thus to generate a swirling motion of the plasma gas right at the location of the plasma arc column or jet.

In a plasma arc torch of the character in which the electrode and nozzle are relatively displaceable between a position of engagement and a position in which the electrode is spaced a working distance from the nozzle, the plasma gas can move beneath the nose end of the electrode when the latter engages the ribs to increase the available force against the electrode for moving the latter in the direction away from contact with the nozzle. Likewise, when gas is used in a piston chamber to move the electrode into contact with the nozzle by energizing the gas solenoid valve, the force of engagement of the nose of the electrode with the nozzle is optimized due to the smaller area of contact between the electrode and nozzle. Accordingly, the gas pressure required to provide good electrical contact between the electrode and nozzle can be reduced relative to that required when an electrode engages a smooth inner surface of a nozzle.

In accordance with another aspect of the invention, the nozzle component is structured and mounted on a torch body by a coaxial sleeve arrangement which provides an annular cooling cavity therebetween for flow of a portion of the plasma gas to provide a conical shield of gas about the plasma jet exiting the gas chamber within the nozzle. Preferably, the coaxial sleeve components axially capture a flange arrangement on the outer periphery of the nozzle member adjacent one end thereof, and the flange and corresponding end of the nozzle are in communication with swirling gas flowing through the torch body, whereby a portion of the gas flows outwardly and across the flange arrangement while another portion flows inwardly of the nozzle and about the electrode toward the gas chamber. The outer periphery of the nozzle is provided with an axially extending recess downstream of the flange arrangement and by which gas flowing across the latter is deflected radially outwardly and axially forwardly of the nozzle to form a shielding gas cone about the plasma jet exiting the gas chamber. The flange arrangement is in communication with the annular cooling cavity and, together with the recess downstream therefrom provides a structurally simple nozzle component by which the flow of a portion of the plasma gas is controlled to achieve cooling and the formation of a conical gas shield while the flow of another portion of the gas is directed between the nozzle and electrode for flow to the gas chamber for the creation of a plasma jet therein. Preferably, the flow of plasma gas between the electrode and nozzle and toward the gas chamber is from a swirling arrangement upstream of the nozzle and, while the structure of the nozzle for obtaining the external flow into the cavity for cooling and along the outer side of the nozzle to produce a conical gas shield provides considerable advantage independent of the swirling of the plasma gas from the periphery of the gas chamber to the outlet opening therefrom, optimum advantage is realized when the latter swirling motion is provided in conjunction with producing the plasma jet.

It is accordingly an outstanding object of the present invention to provide improvements in connection with the flow of plasma gas relative to electrode and nozzle components of a plasma gas torch.

Another object is the provision of the nozzle of a plasma arc torch with an arrangement for swirling the plasma gas as it flows to and through the outlet opening from the gas chamber between the electrode and nozzle.

A further object is the provision of a plasma arc torch with an improved nozzle and electrode assembly in which the plasma gas flow is controlled to optimize cooling, maintaining linearity with respect to the plasma jet emitted therefrom and plasma gas shielding of the jet.

Yet a further object is the provision of a plasma torch of the character having nozzle and electrode components which are relatively displaceable for contact and separation in conjunction with creating a pilot arc with improved gas flow control by which gas biasing of the components both into and out of engagement with one another is optimized.

Yet another object is the provision of a plasma torch having a nozzle and electrode assembly which provides improved flow control characteristics with regard to the plasma gas and by which the quality of the arc plasma column or jet, the quality of work performed and the efficiency and cost of operation of the torch are optimized.

BRIEF DESCRIPTION OF THE DRAWINGS

The foregoing objects and others will in part be obvious and in part pointed out more fully hereinafter in conjunction with the written description of preferred embodiments of the invention illustrated in the accompanying drawings in which.

DESCRIPTION OF PREFERRED EMBODIMENTS

Figure 1:
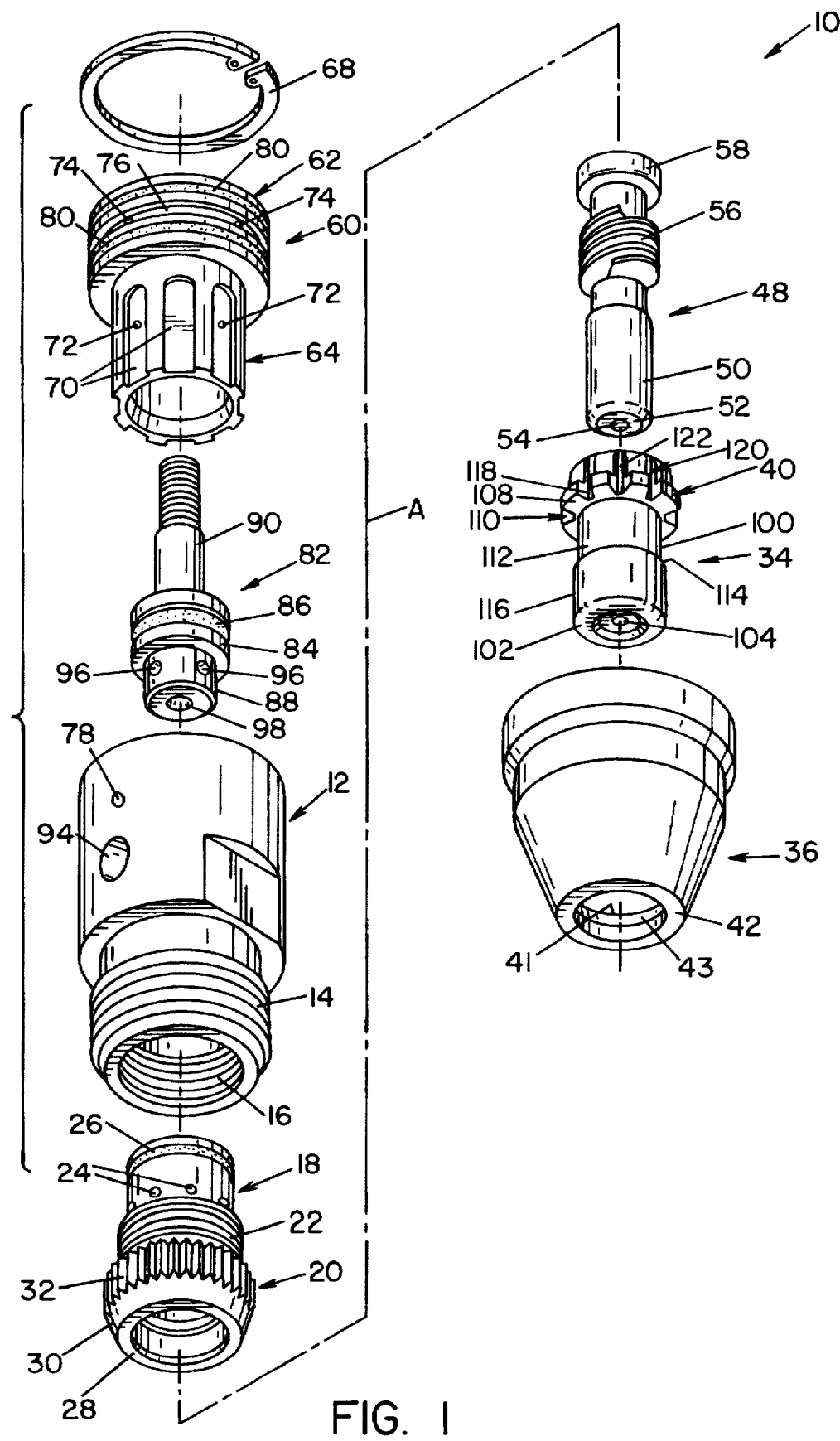
FIG. 1 is an exploded perspective view of the component parts of a plasma arc torch in accordance with the present invention.

Referring now in greater detail to the drawings, wherein the showings are for the purpose of illustrating preferred embodiments of the invention only and not the purpose of limiting the invention, FIGS. 1 and 2 of the drawing illustrate a plasma arc torch 10 having an axis A and comprising a body portion 12 coaxial with axis A and supporting coaxially arranged nozzle, electrode and electrode displacing components as described in greater detail hereinafter. With regard to the vertical orientation of torch 10 shown in FIG. 2, body portion 12 has a lower end provided with outer and inner threads 14 and 16, respectively, and a swirl ring assembly comprising a sleeve of insulting material 18 and a mounting sleeve 20 are received in the lower end of body portion 12 and mounted thereon by external threads 22 on sleeve 20 interengaging with internal threads 16 on body portion 12. For the purposes which will be described or which will become apparent hereinafter, the inner end of insulating sleeve 18 is provided with a plurality of ports 24 opening radially therethrough and an O-ring seal 26 in a recess extending about the periphery thereof, and the lower end of mounting sleeve 20 is provided with an end face 28 transverse to axis A, a conical wall 30 diverging relative to end face 28, and an outer surface extending axially upwardly from conical wall 30 and defined by a plurality of V-shaped fins 32 extending about the periphery of the mounting sleeve. A shoulder, not designated numerically extends radially inwardly from the upper ends of fins 32 and engages against the lower end face of body portion 12 to position the swirling ring assembly therein.

A nozzle component 34 is mounted on the lower end of body portion 12 by a sleeve member or shield cup 36 having internal threads 38 on its upper end engaging with external threads 14 on body member 12. Nozzle member 34, which will be described in greater detail hereinafter, includes a mounting flange 40 extending thereabout intermediate the axially opposite ends thereof and which is axially captured between end face 28 of mounting sleeve 20 and a radially inwardly extending shoulder 41 provided by flange 42 at the lower end of shield cup 36. As best seen in FIG. 2, the inner side of shield cup 36 includes a conical surface 44 diverging from shoulder 41 to internal threads 38 and which is radially spaced from conical wall 30 and fins 32 of mounting sleeve 20 to provide a cavity 46 therewith for the purpose set forth hereinafter.

Torch 10 further includes an electrode 48 coaxially therewith and supported therein for axial displacement relative to nozzle 34. Electrode 48 includes a nose end 50 received in nozzle 34 and having a cylindrical outer surface terminating at its lower end in a nose end surface 52. The lower end of nose portion 50 includes an insert 54 of hafnium, zirconium, tungsten, or the like and which, as is well known, functions in conjunction with the nozzle to create a plasma arc in connection with operation of the torch. Electrode 48 is provided axially inwardly of nose portion 50 with a gas swirling portion defined by helical swirling grooves 56 and which swirling portion is received in sleeve 18 of the swirl ring assembly for grooves 56 to define swirl passageways therewith. The inner most end of electrode 48 is provided with a head 58, and the helical passageways between swirling grooves 56 and sleeve 18 have inlet ends spaced axially inwardly of head 58 and adjacent ports 24 through sleeve 18 and outlet ends spaced axially inwardly from nose portion 50 and adjacent the axially spaced apart ends of nozzle 34 and sleeve 18.

Torch 10 further includes a piston and cylinder arrangement by which electrode 48 is axially displaceable relative to torch body 12 and thus nozzle 34. More particularly in this respect, the upper end of torch body 12 receives and supports a cylinder component 60 including a head portion 62 adjacent the upper end of body 12 and a sleeve portion 64 extending axially downwardly therefrom and having a lower end axially overlapping the outer side of sleeve 18 of the swirl ring assembly. Head portion 62 engages in torch body 12 against a shoulder 66, and cylinder component 60 is axially retained in torch body 12 by a split ring 68. For the purposes which will become apparent hereinafter, the outer side of sleeve portion 64 of cylinder component 60 is provided with a plurality of axially extending recesses 70 circumferentially spaced apart about the periphery thereof, and a plurality of ports 72 extending radially through sleeve portion 64 from the bottoms of alternate ones of the recesses, although it will be appreciated that the latter ports could extend through the bottoms of all of the recesses. Also for the purposes which will become apparent hereinafter, head portion 62 of the cylinder component is provided with radially extending vent passages 74 opening into a peripheral vent passageway 76 which is vented to atmosphere through a port 78 in torch body 12, and these vent passages are axially between a pair of O-rings 80 received in corresponding recesses therefor in the outer periphery of head portion 62 for sealing interengagement with the inner surface of torch body 12 when the cylinder component is mounted therein.

The piston and cylinder assembly of torch 10 further includes a piston member 82 having a head 84 supporting an annular sealing ring 86, an axially inner end 88 and an axially outer end in the form of a stem 90. Piston 82 is received in and is axially reciprocable relative to cylinder component 60 and, in this respect, head 84 of the piston is received in sleeve portion 64 of the cylinder component with inner end 88 engaging axially inner end 58 of electrode 48. A compression spring 92 biases piston 82 downwardly from the position thereof shown in FIG. 2, and piston 82 is displaced to the position thereof shown in FIG. 2 by plasma gas under pressure introduced through inlet passageway 94 and flowing axially along recesses 70 and thence radially inwardly through parts 24 in sleeve 18 and against the underside of head 58 of the electrode. A portion of the gas entering inlet passageway 94 flows radially inwardly through ports 72 to ports 96 extending radially into stem 90 and then upwardly through axial passageway 98 in the stem. The flow of gas into inlet 94 is controlled by a solenoid valve, not shown, and which may for example open in response to the torch operator depressing the torch trigger to start the torch. During displacement of piston 82 to the position shown in FIG. 2, air above piston head 84 is vented to atmosphere through the vent passageways 74, 76 and 78. When the operator releases the torch trigger, the solenoid valve closes, gas pressure is removed from inlet passageway 94, spring 92 displaces piston 82 downwardly from the position shown in FIG. 2, thus displacing electrode 48 downwardly. Air beneath piston head 84 is always vented through radial ports 96 and axial passageway 98 and this advantageously provides for cooling the piston. During downward movement of piston 82, air is drawn into the space above piston head 84 through vent passageways 74, 76 and 78. During operation of the torch, as will become apparent hereinafter, plasma gas is continuously flowed through the torch body and between the nozzle and electrode components for cooling purposes and for establishing a plasma arc jet. As will be appreciated from the foregoing description, such cooling and work gas is introduced in torch body 12 through inlet passage 94 which opens radially through the torch body adjacent the upper ends of recesses 70 in sleeve portion 64 of cylinder member 60.

Referring now in particular to FIGS. 3-6 of the drawing, nozzle component 34 is a tubular component having a cylindrical wall 100 coaxial with axis A, the upper end 101 of which is open to receive nose portion 50 of electrode 48 and the lower end of which is closed by an end wall 102 transverse to axis A and having a plasma arc outlet opening 104 therethrough which is coaxial with axis A. Mounting flange 40 has axially opposite upper and lower sides 106 and 108, respectively, and an outer periphery which is provided with radially outwardly open V-shaped recesses 110 equally spaced apart circumferentially thereabout. The outer surface of nozzle 34 between lower side 108 of flange 40 and the lowermost end of end wall 102 comprises coaxial, axially adjacent first cylindrical, conical and second cylindrical surface portions 112, 114 and 116, respectively, which extend sequentially from side 108 of flange 40 to the lowermost end of the nozzle. Surface portion 116 has a diameter greater than that of surface portion 112, and conical surface portion 114 accordingly diverges from the lower end of surface portion 112 to the upper end of surface portion 116. For the purpose which will be described in greater detail hereinafter, each of the recesses 110 across flange 40 has a radially inner end 118 spaced radially outwardly from first cylindrical surface portion 112, and the upper end of nozzle 34 between upper side 106 of flange 40 and upper end 101 of wall 100 is provided with a plurality of axially extending grooves 120. Grooves 120 correspond in number with recesses 110 and are radially and circumferentially aligned with a corresponding one of the recesses 110 and, accordingly, have radially inner ends 122 which are coplanar with inner ends 118 of recesses 110.

Figure 5:
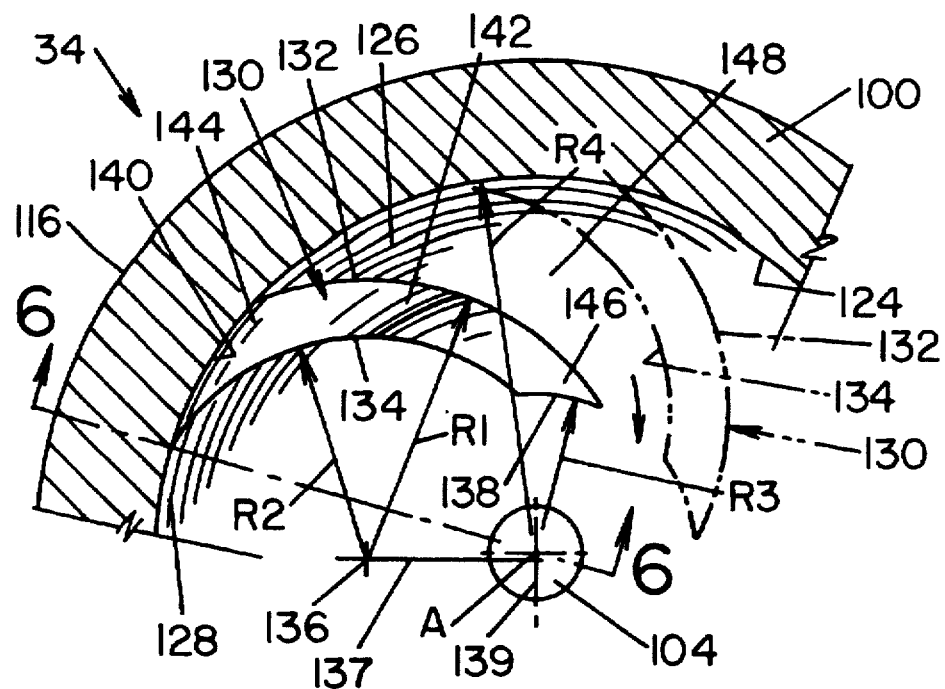
FIG. 5 is a detailed plan view showing the dimensional and geometrical criteria for the swirling ribs and channels on the nozzle; and, FIG. 6 is a detailed sectional elevation view of a portion of the end wall of the nozzle taken along line 6—6 in FIG. 5 and showing, in projection, the profile of a swirling rib in accordance with the preferred embodiment.

Wall 100 of nozzle 34 has a cylindrical inner surface 124 extending from upper end 101 of wall 100 toward end wall 102 of the nozzle. End wall 102 has an inner surface 126 which, in the embodiment illustrated, diverges slightly relative to surface 124 in extending radially inwardly thereof toward outlet opening 104. For the purpose set forth hereinafter, the juncture 128 between surfaces 124 and 126 is preferably arcuate. Inner surface 126 of end wall 102 is provided with a plurality of swirl ribs 130 equally spaced apart circumferentially about axis A and extending circumferentially and radially inwardly from inner surface 124 of wall 100 toward outlet opening 104. In the embodiment illustrated, six such swirl ribs 130 are provided and, as best seen in FIG. 5, each of the ribs comprises circumferentially spaced apart arcuately parallel side walls 132 and 134 respectively having radii of curvature R1 and R2 from a reference point 136 laterally spaced from axis A on a reference line 137 which is offset from axis A on a reference line 139 perpendicular to line 137. Each rib 130 further includes arcuate, radially inner and outer ends 138 and 140 respectively having radii of curvature R3 and R4 from axis A. The reference lines 137 and reference points 136 for radii of curvature R1 and R2 for circumferentially adjacent ones of the ribs 130 are circumferentially spaced apart by an angle equal to 360° divided by the number of ribs. Accordingly, in the embodiment illustrated, reference line 137 and reference point 136 for the rib 130 shown in phantom in FIG. 5 would be 60° clockwise from the positions shown in the latter Figure. As will be appreciated from FIG. 5, the radius of curvature for the outer ends of ribs 130 corresponds to that of inner surface 124 of nozzle wall 100. As will be appreciated from FIG. 6, each of the swirl ribs 130 has a top surface 142 having a radially outer end which is axially spaced from inner surface 126 of end wall 102 and which includes an arcuate portion 144 which blends with inner surface 124 of nozzle wall 100. Top surface 142 tapers axially inwardly from the outer end thereof to the inner end which includes an arcuate portion 146 which blends with inner surface 126 of end wall 102. Preferably, top surface 142 is slightly convex between the radially inner and outer ends thereof so as to increase the area of surface engagement of the electrode therewith during startup of the torch.

With further reference to FIGS. 3–6, circumferentially adjacent ones of the swirl ribs 130 provide gas flow channels 148 therebetween each of which has an entrance end at inner surface 124 of nozzle wall 100 and an outlet end between the radially inner ends of wall 132 of one of the adjacent ribs and wall 134 of the other. As will be appreciated in particular from FIGS. 3 and 5, the circumferential distance between the latter walls at the entrance end of each channel is greater than that between the walls at the outlet end of the channel, whereby each channel 148 is adapted to guide gas flowing into the entrance end thereof along an arcuate path which is constricted in the direction from the entrance to the outlet end of the channel. Moreover, the channels are configured to discharge the gas from the outlet ends thereof in a direction which is generally tangential with respect to outlet opening 104 whereby the channels cooperatively swirl and radially squeeze the gas as it enters outlet opening 104, thus to optimize maintaining linearity with respect to the plasma jet exiting the torch.

By way of example, and with respect to the embodiment herein illustrated and described, in a nozzle wherein the inner diameter of surface 124 is about 0.340 inch and inner side 126 of wall 102 is at an angle of about 15° relative to a plane transverse to axis A, outlet opening 104 has a diameter of about 0.042 inch and the dimensions R1, R2, R3, and R4 for ribs 130 are respectively 0.125 inch, 0.100 inch, 0.070 inch, and 0.170 inch. The offset for reference point 136 from axis A is 0.076 inch on a line spaced 0.004 inch from axis A, and the radius of curvature of each of the arcuate portions 128, 144 and 146 between the nozzle surfaces 124 and 126 and between the latter surfaces and the outer and inner ends of ribs 130 is 0.050 inch. Finally, the convex curvature of top surface 142 of each of the ribs has a radius of 0.125 inch from a reference point laterally spaced 0.207 inch from axis A and axially spaced 0.643 inch from top side 106 of flange 40.

Figure 2:
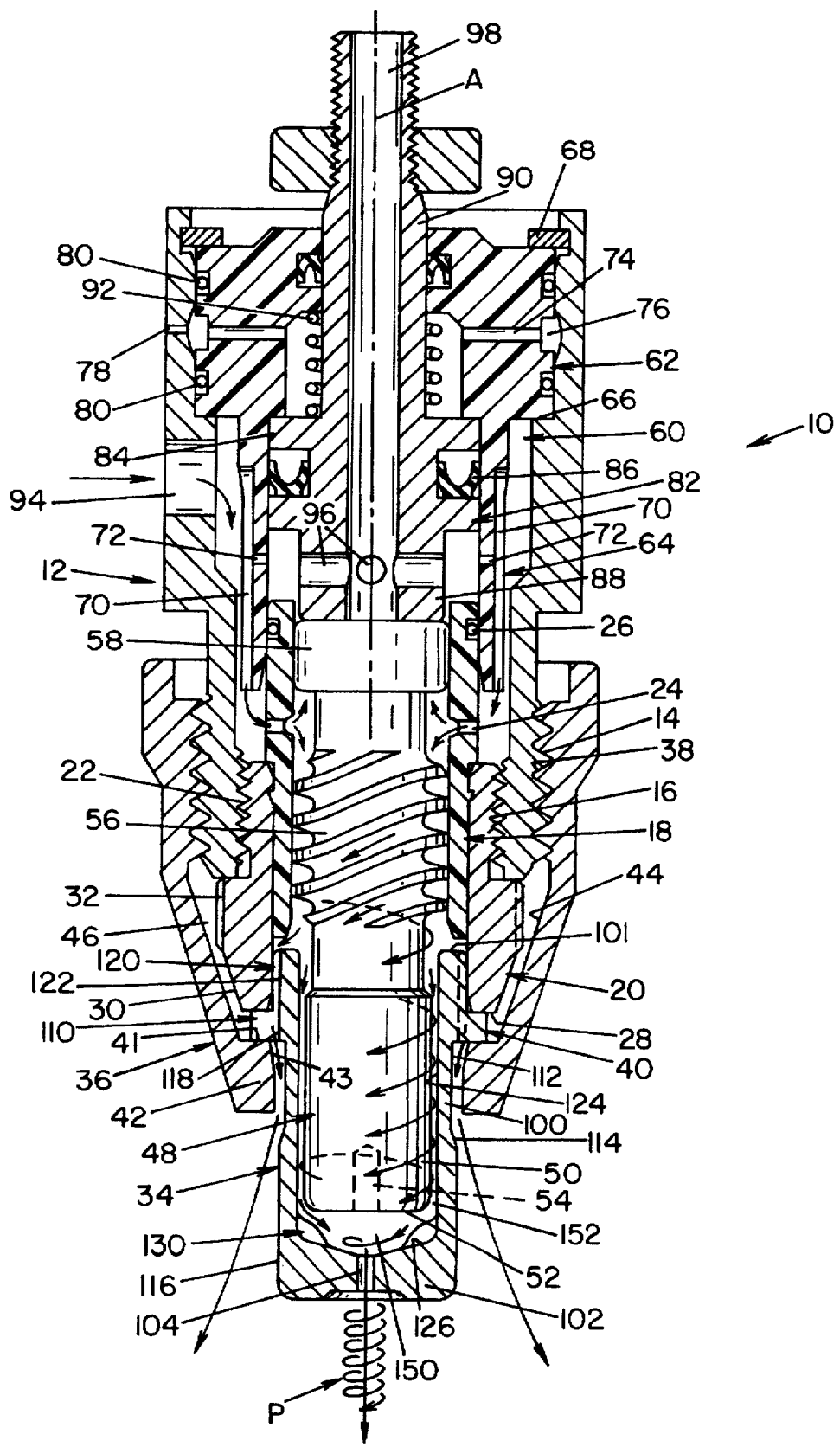
FIG. 2 is a sectional elevation view of the assembled component parts of the torch.
Figure 3:
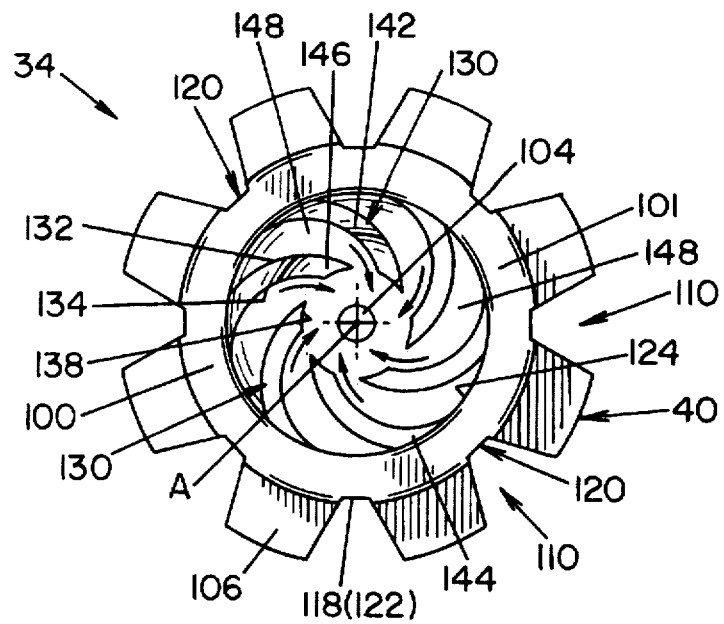
FIG. 3 is a plan view of the nozzle of the torch.

Referring now to FIG. 2 in connection with the foregoing description of FIGS. 3–6, nose portion 50 of electrode 48 is shown in its operating position spaced upwardly from end wall 102 of nozzle 34. As is well known, the electrode and nozzle are adapted to be connected across a source of arc current whereby, when electrode 48 is displaced downwardly from the position shown in FIG. 2 to contact nozzle 34, in this instance by engaging swirl ribs 130, and is then moved back toward the position shown in FIG. 2 a pilot arc is generated therebetween. In connection with such starting and operation of the torch in the embodiment illustrated, the area between lower end face 52 of nose portion 50 of nozzle 48 and the axially inner surface 126 of end wall 102 of nozzle 34 provides a plasma gas chamber 150 having an annular entrance 152 about the outer periphery thereof as defined by the annular space between inner surface 124 of the nozzle and the annular outer space of nose portion 50 of electrode 48. Prior to creating the pilot arc, lower end 52 of nose portion 50 of the electrode engages ribs 130 under the influence of compression spring 92, and plasma gas is introduced through inlet passage 94 in torch body 12 for flow in the annular space between the torch body and cylinder sleeve 64 and axially along recesses 70 therein toward swirl ports 24 in sleeve component 18 of the swirl ring assembly. The plasma gas then flows radially inwardly through ports 24 and acts against the underside of head 58 of electrode 48 to displace the electrode upwardly to the position shown in FIG. 2 against the bias of spring 92. The gas also flows downwardly about the upper end of electrode 48 along swirl passages 56 to the lower end of sleeve 18 at which a part of the gas flows in a swirl pattern in the annular passage between inner surface 124 of nozzle 34 and the outer surface of nose portion 50 of the electrode and thence into gas chamber 150 from peripheral entrance 152. The plasma gas at this point flows circumferentially and radially inwardly along the channels between adjacent ribs 130 and flows through the outlet ends of the channels generally tangentially with respect to the peripheral edge of outlet opening 104. Thus, the gas flows in a circular path about and progressively toward opening 104 and then through opening 104 in a swirling pattern. As mentioned above when the electrode moves out of contact with the nozzle, a pilot arc is created between the electrode and nozzle whereupon plasma jet P exits gas chamber 150 in the swirling pattern generated by ribs 130 and channels 148 therebetween. As the plasma gas continues to flow through chamber 150 pressure is exerted against inner end 52 of the electrode whereby less pressure is required to maintain electrode 48 to its operating position.

Figure 4:
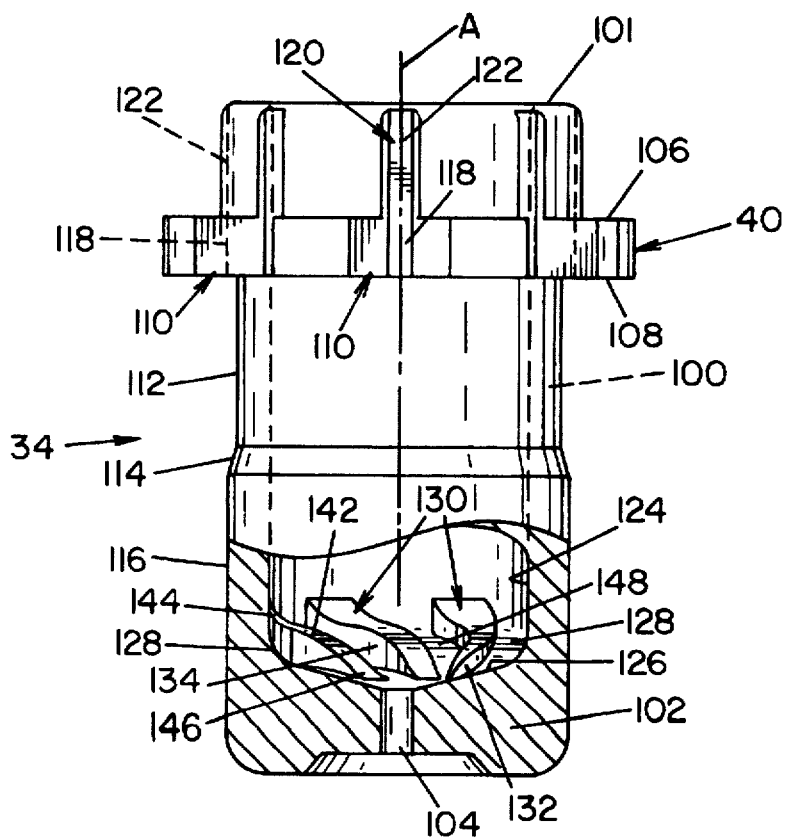
FIG. 4 is a side elevation view, partially in section, of the nozzle.
Figure 6:
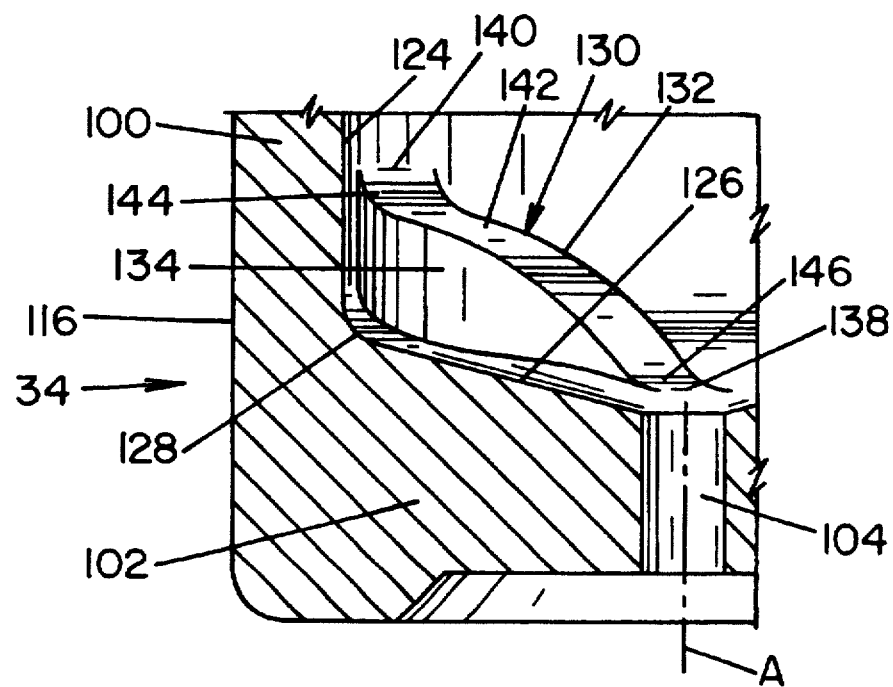

Further in connection with plasma gas flow into and radially across gas chamber 150 to outlet opening 104, as will be appreciated from FIGS. 4 and 6, the gas flow through entrance 152 against top surfaces 142 of ribs 130 and into the entrances of channels 148 therebetween is advantageously smoothed out by the arcuate surfaces 144 and 128 adjacent entrance 152, thereby minimizing or avoiding turbulence in the gas flow and optimizing the transition of the flow thereof from the axial and circumferential flow along nose portion 50 of the electrode to the circumferential and radial flow along ribs 130 in channels 148 toward outlet opening 104. In connection with such transitional flow, it is to be noted at this point that the direction of the swirling flow about nose portion 50 of the electrode upstream from chamber 150 corresponds to the circumferential direction of flow through channels 148 between the ribs 130 which also promotes achieving the transitional flow with minimal or no turbulence. Once the pilot arc is created the torch operates in a non-transferred pilot arc mode and, is well known, the nozzle can be moved into proximity with a workpiece for the arc to be transferred thereto and for the torch to then operate in the arc-transferred mode.

Further in connection with operation of the torch, the structure of nozzle 34 thereof provides further advantage in connection with directional control of the flow of the portion of the plasma gas for cooling purposes. In this respect, as will be appreciated from FIGS. 2–4, a portion of the plasma gas flowing through swirl ports 24 and thence along helical swirl passages 56 to the exit ends thereof flows laterally outwardly across upper end 101 of nozzle 34 and thence axially through grooves 120 in the outer surface of the nozzle to and across recesses 110 in mounting flange 40 of the nozzle. Furthermore, a portion of the plasma gas flowing through grooves 120 flows radially outwardly from recesses 110 into the annular space between surfaces 30 and 44 of mounting rings 20 and 36 and into cavity 46 across cooling fins 32, thus to promote cooling of the component parts of the torch in this area. Still another portion of the plasma gas flowing through grooves 120 flows axially across recesses 110 in flange 40 and is deflected radially inwardly against first cylindrical surface 112 of nozzle 34 for flow therealong toward conical surface portion 114. More particularly in this respect, shoulder 41 on mounting sleeve 36 radially overlies a portion of recesses 110 adjacent lower side 108 of flange 40, and a conical wall portion 43 extends downwardly from shoulder 41 in converging relationship with nozzle surface portion 112 and thus deflects the gas flowing axially along the bottoms 118 of recesses 110 radially inwardly toward nozzle surface portion 112. As the gas flows axially along the latter surface portion, it impinges upon conical surface portion 114 and is deflected radially outwardly and axially therefrom to form a conical gas shield extending about plasma jet P.

While considerable emphasis has been placed herein on the structures and structural interrelationships between the component parts of the preferred embodiments, it will be appreciated that many embodiments can be made and that many changes can be made in the preferred embodiments without departing from the principals of the invention. In particular, it will be appreciated that the nozzle structure can be used in a torch in which the nozzle and electrode are mounted in axially fixed relationship relative to one another and wherein starting of the torch is achieved other than by displacing the electrode into and out of contact with the nozzle. Moreover, it will be appreciated that other swirl rib contours on the inner side of the end wall of the nozzle can be devised and that more or less than the preferred six ribs can be used. Still further, it will be appreciated that the swirling of gas across the end wall of the nozzle can be used to advantage without the swirling of the gas upstream of the end wall, and that the swirling of gas upstream of the end wall can be achieved other than by the swirl passages on the electrode in the preferred embodiment. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

Having thus described the invention, it is claimed:

1. In a plasma torch comprising a tubular nozzle having an axis and axially opposite ends, an end wall at one of said ends, an electrode in said nozzle having a nose end facing said end wall, said nose end and said end wall providing a plasma gas chamber and said end wall having a gas chamber outlet opening extending axially therethrough, said chamber having an entrance spaced radially outwardly of said outlet opening, means for flowing a plasma gas through said chamber in the direction from said entrance toward said outlet opening, and means for creating an arc between said nozzle and electrode for a plasma jet to flow through said outlet opening, the improvement comprising: rib means on said end wall of said nozzle for radially guiding the flow of said plasma gas from said entrance to said outlet opening.

2. The improvement according to claim 1, wherein said rib means includes a plurality of ribs on said end wall circumferentially spaced apart about said outlet opening.

3. The improvement according to claim 1, wherein said rib means for guiding said plasma gas includes a plurality of ribs on said end wall of said nozzle, said ribs being circumferentially spaced apart about said outlet opening and having radially outer and inner ends with respect thereto, and said ribs being arcuate between said outer and inner ends thereof.

4. The improvement according to claim 3, wherein said outlet opening has an axis, and each said radially outer and inner end of each said ribs is arcuate and has a radius of curvature with respect to said axis of said opening.

5. The improvement according to claim 4, wherein said chamber has a circular peripheral wall coaxial with said axis of said opening and having a radius of curvature providing the radius of curvature of the radially outer end of said rib.

6. The improvement according to claim 5, wherein said outlet opening has a circular peripheral edge and the radially inner ends of said ribs are spaced radially outwardly of said edge.

7. The improvement according to claim 3, wherein said outlet opening has an axis and each said rib has circumferentially opposite sides, each of said opposite sides being arcuate and having a radius of curvature with respect to a reference axis laterally spaced from and parallel to said axis of said opening.

8. The improvement according to claim 7, wherein each said radially outer and inner end of each said rib is arcuate and has a radius of curvature with respect to said axis of said opening.

9. The improvement according to claim 8, wherein said chamber has a peripheral wall coaxial with said axis of said opening and said opening has a peripheral edge, said peripheral wall having a radius of curvature providing the radius of curvature of the radially outer end of said rib, and the radially inner end of said rib being spaced radially outwardly of said opening.

10. The improvement according to claim 9, wherein each said rib has a top wall facing said nose end of said electrode and tapering toward said end wall of said nozzle in the direction from the radially outer toward the radially inner end of the rib.

11. In a plasma torch comprising a tubular nozzle having an axis and axially opposite ends, and end wall at one of said ends, an electrode in said nozzle having a nose end facing said end wall, said nose end and said end wall providing a plasma gas chamber and said end wall having a gas chamber outlet opening extending axially therethrough, said chamber having an entrance spaced radially outwardly of said outlet opening, means for flowing a plasma gas through said chamber in the direction from said entrance toward said outlet opening, and means for creating an arc between said nozzle and electrode for a plasma jet to flow through said outlet opening, the improvement comprising: rib means on said end wall of said nozzle for radially guiding the flow of said plasma gas from said entrance to said outlet opening, said rib means providing said end wall with a plurality of gas directing channels circumferentially spaced apart about said outlet opening.

12. The improvement according to claim 11, wherein said channels have radially outer and inner ends each having a circumferential dimension, the circumferential dimension of said outer end being greater than that of said inner end.

13. The improvement according to claim 11, wherein said channels have radially outer and inner ends and are arcuate therebetween.

14. The improvement according to claim 11, wherein said rib means providing said channels includes a plurality of ribs on said end wall circumferentially spaced apart about said outlet opening, each said channel being the space between a circumferentially adjacent pair of said ribs.

15. The improvement according to claim 14, wherein said ribs have radially outer and inner ends and are generally uniform in circumferential dimension therebetween.

16. The improvement according to claim 14, wherein said ribs have radially outer and inner ends and the radially inner ends of circumferentially adjacent ones of said ribs are circumferentially spaced apart a distance less than that between the outer ends of said adjacent ones of said ribs.

17. The improvement according to claim 14, wherein each of said ribs has radially outer and inner ends, circumferentially opposite sides and a top wall between said sides and facing said nose end of said electrode, said top wall tapering toward said end wall in the direction from the outer toward the inner end of said rib.

18. The improvement according to claim 17, wherein each said channel has a radially extending bottom surface and an axially extending outer end surface between circumferentially opposed sides of adjacent one of said ribs, and an arcuate surface joining said bottom surface and outer end surface.

19. The improvement according to claim 18, wherein said bottom surface of said channel tapers axially away from said nose end of said electrode in the direction from the outer toward the inner ends of said adjacent ones of said ribs.

20. The improvement according to claim 17, wherein said top wall of said rib has an arcuate portion between said radially outer and inner ends, said arcuate portion being convex with respect to said nose end of said electrode.

21. The improvement according to claim 14, wherein said ribs have radially outer and inner ends and are arcuate therebetween.

22. The improvement according to claim 21, wherein the radially inner ends of circumferentially adjacent ones of said ribs are circumferentially spaced apart a distance less than that between the outer ends of said adjacent ones of said ribs.

23. The improvement according to claim 22, wherein each of said ribs has radially outer and inner ends, circumferentially opposite sides and a top wall between said sides and facing said nose end of said electrode, said top wall tapering toward said end wall in the direction from the outer toward the inner end of said rib.

24. The improvement according to claim 23, wherein each said channel has a radially extending bottom surface and an axially extending radially outer end surface between circumferentially opposed sides of adjacent ones of said ribs, said bottom surface tapering axially away from said nose end of said electrode in the direction from the outer toward the inner ends of said adjacent ones of said ribs.

25. The improvement according to claim 24, wherein said chamber has a peripheral wall, said outer ends of said ribs merging with said peripheral wall, portions of said peripheral wall between circumferentially adjacent ones of said ribs providing the axially extending outer end surfaces of said channels, first arcuate surfaces joining said bottom surfaces and radially outer end surfaces, and second arcuate surfaces joining the top walls of said ribs and said peripheral wall of said chamber.

26. The improvement according to claim 25, wherein said top wall of said rib has an arcuate portion between said radially outer and inner ends, said arcuate portion being convex with respect to said nose end of said electrode.

27. A plasma torch comprising, a tubular nozzle having an axis and an end wall transverse to said axis, an electrode in the nozzle coaxial therewith and having an end adjacent said end wall and providing a gas chamber therewith, an outlet opening from said chamber through said end wall coaxial with said axis, said nozzle and electrode providing said gas chamber with an annular entrance about said end of said electrode, means for flowing a plasma gas into said chamber through said entrance for flow radially inwardly from said entrance to said outlet opening, means for creating an arc between said nozzle and electrode for a plasma jet to flow through said outlet opening, said end wall of said nozzle having an axially inner side facing said end of said electrode, and a plurality of gas flow channels on said inner side for directing the flow of gas radially inwardly of said chamber from said entrance toward said outlet opening.

28. The torch according to claim 27, wherein each said gas flow channel includes means for circumferentially constricting gas flowing from said entrance toward said outlet opening.

29. A plasma torch comprising, a tubular nozzle having an axis and an end wall transverse to said axis, an electrode in the nozzle coaxial therewith and having an end adjacent said end wall and providing a gas chamber therewith, an outlet opening from said chamber through said end wall coaxial with said axis, said nozzle and electrode providing said gas chamber with an annular entrance about said end of said electrode, means for flowing a plasma gas into said chamber through said entrance for flow radially inwardly from said entrance to said outlet opening, means for creating an arc between said nozzle and electrode for a plasma jet to flow through said outlet opening, said end wall of said nozzle having an axially inner side facing said end of said electrode, and a plurality of gas flow channels on said inner side for directing the flow of gas radially inwardly of said chamber from said entrance toward said outlet opening, each said gas flow channel having an exit end for directing gas generally tangentially of said outlet opening.

30. The torch according to claim 27, wherein said outlet opening has a peripheral edge and said gas flow channels have exit ends for gas flowing therefrom to flow along a circular path relative to said edge.

31. The torch according to claim 27, wherein each said gas flow channel directs the flow of gas along an arcuate path from said entrance toward said outlet opening.

32. A plasma torch comprising, a tubular nozzle having an axis and an end wall transverse to said axis, an electrode in the nozzle coaxial therewith and having an end adjacent said end wall and providing a gas chamber therewith, an outlet opening from said chamber through said end wall coaxial with said axis, said nozzle and electrode providing said gas chamber with an annular entrance about said end of said electrode, means for flowing a plasma gas into said chamber through said entrance for flow radially inwardly from said entrance to said outlet opening, means for creating an arc between said nozzle and electrode for a plasma jet to flow through said outlet opening, said end wall of said nozzle having an axially inner side facing said end of said electrode, and a plurality of gas flow channels on said inner side for directing the flow of gas radially inwardly of said chamber from said entrance toward said outlet opening, each said gas flow channel directing the flow of gas along an arcuate path from said entrance toward said outlet opening, and said arcuate path being progressively constricted in the direction from said entrance toward said outlet opening.

33. A plasma torch comprising, a tubular nozzle having an axis and an end wall transverse to said axis, an electrode in the nozzle coaxial therewith and having an end adjacent said end wall and providing a gas chamber therewith, an outlet opening from said chamber through said end wall coaxial with said axis, said nozzle and electrode providing said gas chamber with an annular entrance about said end of said electrode, means for flowing a plasma gas into said chamber through said entrance for flow radially inwardly from said entrance to said outlet opening, means for creating an arc between said nozzle and electrode for a plasma jet to flow through said outlet opening, said end wall of said nozzle having an axially inner side facing said end of said electrode, and a plurality of gas flow channels on said inner side for directing the flow of gas radially inwardly of said chamber from said entrance toward said outlet opening, said inner side of said end wall having a radially outer periphery axially aligned with said entrance and including a plurality of circumferentially spaced apart ribs extending radially inwardly from said periphery, and the space between circumferentially adjacent ones of said ribs providing said gas flow channels.

34. The torch according to claim 33, wherein each of said ribs has radially outer and inner ends, circumferentially opposite sides and a top wall between said sides and facing said end of said electrode, circumferentially opposed sides of circumferentially adjacent ones of said ribs converging relative to one another in the direction from the radially outer toward the radially inner ends of the ribs.

35. The torch according to claim 34, wherein each said channel has a radially extending bottom surface and an axially extending radially outer end surface between said circumferentially opposed sides of adjacent ones of said ribs, said bottom surface tapering axially away from said end of said electrode in the direction from the outer toward the inner ends of said ribs.

36. The torch according to claim 35, wherein said chamber has a peripheral wall, said outer ends of said ribs merging with said peripheral wall, portions of said peripheral wall between circumferentially adjacent ones of said ribs providing the axially extending radially outer end surfaces of said channels, first arcuate surfaces joining said bottom surfaces and radially outer end surfaces of said channels, and second arcuate surfaces joining the top walls of said ribs and said peripheral wall of said chamber.

37. The torch according to claim 36, wherein said top wall of said rib has a convex contour between said radially outer and inner ends thereof and with respect to said end of said electrode.

38. The torch according to claim 34, wherein said circumferentially opposite sides of each said rib are arcuate relative to said axis in the direction from said outer toward said inner ends thereof.

39. The torch according to claim 38, wherein said top wall of each said rib tapers axially toward said end wall in the direction from said outer toward said inner end of the rib.

40. A plasma torch comprising a torch body, a tubular nozzle mounted in said torch body and having an axis, an axially extending inner surface, axially opposite ends, mounting flange means intermediate said opposite ends and an end wall at one of said opposite ends, an electrode supported in said torch body and including a nose portion in said nozzle and coaxial therewith, said nose portion of said electrode having a nose end adjacent said end wall and providing a gas chamber therewith, said end wall having an outlet opening extending axially therethrough from said chamber, said nose portion of said electrode having a radially outer peripheral surface extending axially from said nose end along said inner surface of said nozzle and providing an annular first gas passageway therewith opening into said chamber and having an entrance end at the other of said opposite ends of said nozzle, said nozzle having an outer side extending between said opposite ends, said outer side of said nozzle including coaxial, axially adjacent first cylindrical, conical and second cylindrical surface portions extending sequentially from said mounting flange means to said one of said opposite ends of said nozzle, said first and second cylindrical surface portions respectively having first and second diameters, said second diameter being greater than said first diameter, said conical surface portion diverging from said first to said second surface portion, means for flowing a gas into said entrance end of said first gas passageway and to said outer side of said nozzle for flow respectively to said gas chamber and axially along said first cylindrical surface portion toward said conical surface portion, and means for creating an arc between said nozzle and electrode for a plasma jet to flow through said outlet opening, said gas flowing along said first cylindrical surface portion being directed radially outwardly and axially toward said one end of said nozzle by said conical surface portion to form a conical gas shield for said plasma jet.

41. The torch according to claim 40, wherein said mounting flange means extends radially outwardly of said outer side intermediate said opposite ends, said flange means having axially opposite first and second sides respectively facing said one and the other of said opposite ends of said nozzle, and means providing a second gas passageway axially along said outer side of said nozzle from said other of said opposite ends toward said one end and including a portion extending axially across said mounting flange means, said second gas passageway having inlet and outlet ends respectively at said other end of said nozzle and said first side of said mounting flange means, and said means for flowing gas to said outer side of said nozzle including means for flowing gas into said inlet end of said second gas passageway.

42. The torch according to claim 41, and means including nozzle mounting means engaging said first side of said mounting flange means for diverting gas flowing through said outlet end of said second gas passageway radially inwardly toward said first cylindrical surface portion.

43. The torch according to claim 41, further including nozzle mounting means comprising coaxial first and second sleeve members mounted on said torch body and respectively including first and second surfaces axially spaced apart and engaging said mounting flange means therebetween, said first sleeve including an outer surface, said second sleeve surrounding said first sleeve and including an inner surface spaced radially outwardly of said outer surface of said inner sleeve and providing a cavity therewith, said second gas passageway including passages in said mounting flange means in communication with said cavity for a portion of the gas flowing through said second gas passageway to flow into said cavity.

44. The torch according to claim 43, wherein said outer surface of said first sleeve includes a peripheral portion having a plurality of axially extending circumferentially spaced apart cooling fins in said cavity.

45. The torch according to claim 40, wherein said electrode includes an inner end portion extending axially inwardly of said nose portion, said inner end portion including means for creating a swirling flow of said gas about said axis and axially in the direction toward said entrance end of said first gas passageway.

46. The torch according to claim 40, wherein said end wall of said nozzle includes means for imparting a swirling motion to gas flowing from said annular first gas passageway to said outlet opening.

47. The torch according to claim 40, wherein said electrode includes an inner end portion extending axially inwardly of said nose portion, said inner end portion including means for creating a swirling flow of said gas about said axis and axially in the direction toward said entrance end of said first gas passageway, and said end wall of said nozzle including means for imparting a swirling motion to gas flowing from said annular first gas passageway to said outlet opening.

48. The torch according to claim 47, wherein said mounting flange means extends radially outwardly of said outer side intermediate said opposite ends, said flange means having axially opposite first and second sides respectively facing said one and the other of said opposite ends of said nozzle, and means providing a second gas passageway axially along said outer side of said nozzle from said other of said opposite ends toward said one end and including a portion extending axially across said mounting flange means, said second gas passageway having inlet and outlet ends respectively at said other end of said nozzle and said first side of said mounting flange means, and said means for flowing gas to said outer side of said nozzle including means for flowing gas into said inlet end of said second gas passageway.

49. The torch according to claim 48, further including nozzle mounting means comprising coaxial first and second sleeve members mounted on said torch body and respectively including first and second surfaces axially spaced apart and engaging said mounting flange means therebetween, said first sleeve including an outer surface, said second sleeve surrounding said first sleeve and including an inner surface spaced radially outwardly of said outer surface of said inner sleeve and providing a cavity therewith, said second gas passageway including passages in said mounting flange means in communication with said cavity for a portion of the gas flowing through said second gas passageway to flow into said cavity, and said outer surface of said first sleeve including a peripheral portion having a plurality of axially extending circumferentially spaced apart cooling fins in said cavity.

50. The torch according to claim 49, wherein said nozzle mounting means includes gas diverting surface means on said second sleeve member extending axially from said second surface thereof toward said one end of said nozzle and radially inwardly of said axis for diverting gas flowing through said outlet end of said second gas passageway radially inwardly toward said first cylindrical surface portion.

51. The torch according to claim 40, wherein said mounting flange means extends radially outwardly of said outer side intermediate said opposite ends, said flange means having axially opposite first and second side respectively facing said one and the other of said opposite ends of said nozzle, and means providing a second gas passageway axially along said outer side of said nozzle from said other of said opposite ends toward said one end and including a portion extending axially across said mounting flange means, said second gas passageway having inlet and outlet ends respectively at said other end of said nozzle and said first side of said mounting flange means, and said means for flowing gas to said outer side of said nozzle including means for flowing gas into said inlet end of said second gas passageway, said mounting flange means extending about said outer side of said nozzle and having an outer periphery, and said portion of said second gas passageway extending axially across said flange means including a plurality of radially outwardly open recesses spaced apart about said outer periphery.

52. The torch according to claim 51, wherein said recesses have radially inner ends spaced radially outwardly of said first cylindrical surface portion.

53. The torch according to claim 52, wherein said means providing said second gas passageway further includes a plurality of grooves in said outer side of said nozzle extending axially from said second side of said mounting flange means to said other of said opposite ends of said nozzle.

54. The torch according to claim 53, wherein said plurality of grooves corresponds in number to said plurality of recesses, each said groove having a radially inner end circumferentially and radially aligned with the radially inner end of a corresponding one of said recesses.

55. The torch according to claim 54, wherein said electrode includes an inner end portion extending axially inwardly of said nose portion, said inner end portion including means for creating a swirling flow of said gas about said axis and axially in the direction toward said entrance end of said first gas passageway and said inlet end of said second gas passageway.

56. The torch according to claim 55, further including nozzle mounting means including coaxial first and second sleeve members mounted on said torch body and respectively including first and second surfaces axially spaced apart and engaging said mounting flange means therebetween, said second sleeve surrounding said first sleeve and being spaced radially outwardly therefrom to provide an annular cavity therebetween, said recesses in said mounting flange means communicating with said cavity for a portion of the gas flowing across said flange means to flow into said cavity.

57. The torch according to claim 56, wherein said nozzle mounting means includes gas diverting surface means on said second sleeve member extending axially from said second surface thereof toward said one end of said nozzle and radially inwardly of said axis for diverting gas flowing through said outlet end of said second gas passageway radially inwardly toward said first cylindrical surface portion.

58. The torch according to claim 57, wherein said outer surface of said first sleeve includes a peripheral portion having a plurality of axially extending circumferentially spaced apart cooling fins in said cavity.

59. The torch according to claim 58, wherein said end wall of said nozzle includes means for imparting a swirling motion to gas flowing from said annular first gas passageway to said outlet opening.

60. A plasma torch comprising a torch body, a tubular nozzle mounted in said torch body and having an axis, an axially extending inner surface, axially opposite ends, and an end wall at one of said opposite ends, an electrode supported in said torch body and including a nose portion in said nozzle and coaxial therewith, said nose portion of said electrode having a nose end adjacent said end wall and providing a gas chamber therewith, said end wall having an outlet opening extending axially therethrough from said chamber, said nose portion of said electrode having a radially outer peripheral surface extending axially from said nose end along said inner surface of said nozzle and providing an annular first gas passageway therewith opening into said chamber and having an entrance end at the other of said opposite ends of said nozzle, said nozzle having an outer side extending between said opposite ends and mounting flange means integral with and extending radially outwardly of said outer side intermediate said opposite ends, said flange means having axially opposite first and second sides respectively facing said one and the other of said opposite ends of said nozzle, means providing a second gas passageway axially along said outer side of said nozzle from said other of said opposite ends toward said one end and including a portion extending axially across said mounting flange means, said second gas passageway having inlet and outlet ends respectively at said other end of said nozzle and said first side of said mounting flange means, means for flowing a gas into said entrance end of said first gas passageway and into said inlet end of said second gas passageway for flow respectively to said gas chamber and axially along said outer side of said nozzle from said flange means toward said other end, and means for creating an arc between said nozzle and electrode for a plasma jet to flow through said outlet opening, said gas flowing along said outer side toward said other end forming a gas shield surrounding said plasma jet.

61. The torch according to claim 60, and means including nozzle mounting means engaging said first side of said mounting flange means for diverting gas flowing through said outlet end of said second gas passageway radially inwardly toward said outer side of said nozzle.

62. A plasma torch comprising a torch body, a tubular nozzle mounted in said torch body and having an axis, an axially extending inner surface, axially opposite ends, and an end wall at one of said opposite ends, an electrode supported in said torch body and including a nose portion in said nozzle and coaxial therewith, said nose portion of said electrode having a nose end adjacent said end wall and providing a gas chamber therewith, said end wall having an outlet opening extending axially therethrough from said chamber, said nose portion of said electrode having a radially outer peripheral surface extending axially from said nose end along said inner surface of said nozzle and providing an annular first gas passageway therewith opening into said chamber and having an entrance end at the other of said opposite ends of said nozzle, said nozzle having an outer side extending between said opposite ends and mounting flange means extending radially outwardly of said outer side intermediate said opposite ends, said flange means having axially opposite first and second sides respectively facing said one and the other of said opposite ends of said nozzle, means providing a second gas passageway axially along said outer side of said nozzle from said other of said opposite ends toward said one end and including a portion extending axially across said mounting flange means, said second gas passageway having inlet and outlet ends respectively at said other end of said nozzle and said first side of said mounting flange means, means for flowing a gas into said entrance end of said first gas passageway and into said inlet end of said second gas passageway for flow respectively to said gas chamber and axially along said outer side of said nozzle from said flange means toward said other end, means for creating an arc between said nozzle and electrode for a plasma jet to flow through said outlet opening, said gas flowing along said outer side toward said other end forming a gas shield surrounding said plasma jet, nozzle mounting means comprising coaxial first and second sleeve members mounted on said torch body and respectively including first and second surfaces axially spaced apart and engaging said mounting flange means therebetween, said first sleeve including an outer surface, said second sleeve surrounding said first sleeve and including an inner surface spaced radially outwardly of said outer surface of said inner sleeve and providing a cavity therewith, and said second gas passageway including passages in said mounting flange means in communication with said cavity for a portion of the gas flowing through said second gas passageway to flow into said cavity.

63. The torch according to claim 62, wherein said outer surface of said first sleeve includes a peripheral portion having a plurality of axially extending circumferentially spaced apart cooling fins in said cavity.

64. The torch according to claim 60, wherein said electrode includes an inner end portion extending axially inwardly of said nose portion, said inner end portion including means for creating a swirling flow of said gas about said axis and axially in the direction toward said entrance end of said first gas passageway.

65. The torch according to claim 60, wherein said end wall of said nozzle includes means for imparting a swirling motion to gas flowing from said annular first gas passageway to said outlet opening.

66. A plasma torch comprising a torch body, a tubular nozzle mounted in said torch body and having an axis, an axially extending inner surface, axially opposite ends, and an end wall at one of said opposite ends, an electrode supported in said torch body and including a nose portion in said nozzle and coaxial therewith, said nose portion of said electrode having a nose end adjacent said end wall and providing a gas chamber therewith, said end wall having an outlet opening extending axially therethrough from said chamber, said nose portion of said electrode having a radially outer peripheral surface extending axially from said nose end along said inner surface of said nozzle and providing an annular first gas passageway therewith opening into said chamber and having an entrance end at the other of said opposite ends of said nozzle, said nozzle having an outer side extending between said opposite ends and mounting flange means extending radially outwardly of said outer side intermediate said opposite ends, said flange means having axially opposite first and second sides respectively facing said one and the other of said opposite ends of said nozzle, means providing a second gas passageway axially along said outer side of said nozzle from said other of said opposite ends toward said one end and including a portion extending axially across said mounting flange means, said second gas passageway having inlet and outlet ends respectively at said other end of said nozzle and said first side of said mounting flange means, means for flowing a gas into said entrance end of said first gas passageway and into said inlet end of said second gas passageway for flow respectively to said gas chamber and axially along said outer side of said nozzle from said flange means toward said other end, means for creating an arc between said nozzle and electrode for a plasma jet to flow through said outlet opening, said gas flowing along said outer side toward said other end forming a gas shield surrounding said plasma jet, said electrode including an inner end portion extending axially inwardly of said nose portion, said inner end portion including means for creating a swirling flow of said gas about said axis and axially in the direction toward said entrance end of said first gas passageway, and said end wall of said nozzle including means for imparting a swirling motion to gas flowing from said annular first gas passageway to said outlet opening.

67. The torch according to claim 66, further including nozzle mounting means comprising coaxial first and second sleeve members mounted on said torch body and respectively including first and second surfaces axially spaced apart and engaging said mounting flange means therebetween, said first sleeve including an outer surface, said second sleeve surrounding said first sleeve and including an inner surface spaced radially outwardly of said outer surface of said inner sleeve and providing a cavity therewith, said second gas passageway including passages in said mounting flange means in communication with said cavity for a portion of the gas flowing through said second gas passageway to flow into said cavity, and said outer surface of said first sleeve including a peripheral portion having a plurality of axially extending circumferentially spaced apart cooling fins in said cavity.

68. The torch according to claim 67, wherein said nozzle mounting means includes gas diverting surface means on said second sleeve member extending axially from said second surface thereof toward said one end of said nozzle and radially inwardly of said axis for diverting gas flowing through said outlet end of said second gas passageway radially inwardly toward said outer side of said nozzle.

69. The torch according to claim 60, wherein said mounting flange means extends about said outer side of said nozzle and has an outer periphery, and said portion of said second gas passageway extending axially across said flange means includes a plurality of radially outwardly open recesses spaced apart about said outer periphery.

70. The torch according to claim 69, wherein said recesses have radially inner ends spaced radially outwardly of said outer side of said nozzle and said means providing said second gas passageway further includes a plurality of grooves in said outer side of said nozzle extending axially from said second side of said mounting flange means to said other of said opposite ends of said nozzle, said plurality of grooves corresponding in number to said plurality of recesses, and each said groove having a radially inner end circumferentially and radially aligned with the radially inner end of a corresponding one of said recesses.

71. The torch according to claim 70, further including nozzle mounting means including coaxial first and second sleeve members mounted on said torch body and respectively including first and second surfaces axially spaced apart and engaging said mounting flange means therebetween, said second sleeve surrounding said first sleeve and being spaced radially outwardly therefrom to provide an annular cavity therebetween, said recesses in said mounting flange means communicating with said cavity for a portion of the gas flowing across said flange means to flow into said cavity.

72. The torch according to claim 71, wherein said outer surface of said first sleeve includes a peripheral portion having a plurality of axially extending circumferentially spaced apart cooling fins in said cavity.

73. The torch according to claim 71, wherein said end wall of said nozzle includes means for imparting a swirling motion to gas flowing from said annular first gas passageway to said outlet opening.

* * * * *